Patented June 26, 1945

2,378,889

UNITED STATES PATENT OFFICE 2,378,889

3,4-DIHYDROXYPHENISOPROPYL ALKYLAMINES

Gordon A. Alles, San Marino, and Roland N. Icke, Los Angeles, Calif.; said Icke assignor to said Alles No Drawing. Application June 29, 1943, Serial No. 492,725

6 Claims. (Cl. 260—570.8)

This invention relates to new and useful chemical compounds. The principal object of the invention is to provide new chemical compounds useful as medical preparations alone or together with other substances.

The compounds of our present invention comprise α-methyl-β-(3,4-dihydroxyphenyl)ethyl alkylamines of the general structural formula:

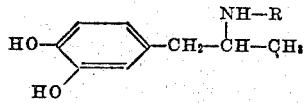

wherein R consists of a member of the group consisting of $CH_3$, $C_2H_5$, n—$C_3H_7$ and iso—$C_3H_7$. The amines included in this formula are referred to specifically by the contracted nomenclature: 3,4-dihydroxyphenisopropyl methylamine, ethylamine, propylamine and isopropylamine. The compounds of the invention include both the bases and their acid addition salts, and the above designated alkylamines may therefore be considered as including, generically, both said bases and said salts. The compounds are physiologically active in animals and man and, while they produce certain medically useful sympathomimetic effects in marked degree when administered, they are much less active in their effects upon the circulation and most commonly cause a fall in blood pressure rather than a rise in blood pressure such as results from the administration of sufficient dosages of epinephrine and related compounds.

In a separate application filed by us of even date herewith, we have described 3,4-dimethoxyphenisopropyl alkylamines and salts thereof, and the methods of making such compounds. A preferable method for making the 3,4-dihydroxyphenisopropyl alkylamines and salts thereof is by the demethylation of the two oxygen atoms of the corresponding 3,4-dimethoxyphenisopropyl alkylamines of the general structural formula:

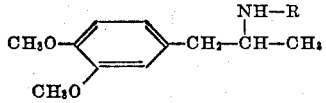

wherein R consists of a member of the group consisting of $CH_3$, $C_2H_5$, n—$C_3H_7$ and iso—$C_3H_7$, by means of heating in concentrated acid solution. While several procedures are possible involving different acids, acid strengths and times of heating, this demethylation can be carried out by boiling for some hours with constant boiling hydrobromic acid (48%) in water or with concentrated hydrochloric acid (36%) in water by heating in a sealed bomb tube at 120° C. for several hours.

The following examples illustrate methods of making 3,4-dihydroxyphenisopropyl methylamine and salts thereof.

Example 1

To 20 milliliters of 48% hydrobromic acid is added 4 grams (0.02 mole) of 3,4-dimethoxyphenisopropyl methylamine and the mixture refluxed by heating in a hot oil bath for 4 hours. After diluting the product with some water and decolorizing the solution with activated charcoal, then evaporating off the water under reduced pressure, there is obtained 3,4-dihydroxyphenisopropyl methylammonium bromide as a glass which has little tendency to crystallize. Treatment of a concentrated aqueous solution of this salt with an equivalent of ammonia or sodium carbonate solution gives the free base, 3,4-dihydroxyphenisopropyl methylamine, as a glassy solid. This material is not readily crystallized but can be converted into various salts by addition of equivalent amounts of inorganic acids or organic acids such as succinic and tartaric acids and gives color reactions with reagents for ortho-diphenolic groups.

Example 2

A solution of 21 grams (0.10 mole) of 3,4-dimethoxyphenisopropyl methylamine in 80 milliliters of 36% hydrochloric acid is sealed into four glass bomb tubes and heated to 120° C. in a bomb furnace for 6 hours. After cooling, the product is diluted with water and decolorized with acid washed charcoal. Evaporation gives 3,4-dihydroxyphenisopropyl methylammonium chloride but this is not readily obtained as a crystalline solid. Treatment of a solution of the chloride in water with an equivalent of silver sulfate and removal of the silver chloride formed results in a solution of the sulfate. Evaporation of this solution yields a glass which becomes crystalline on standing and after recrystallization from ethanol with the addition of acetone yields 3,4-dihydroxyphenisopropyl methylammonium sulfate which melts with decomposition at 270° C.

By using 3,4-dimethoxyphenisopropyl ethylamine, propylamine, or isopropylamine, or the hydrochloric acid addition salts of these compounds, and demethylating by procedures as described above, there is readily obtained:

3,4 - dihydroxyphenisopropyl ethylammonium chloride, which crystallizes from ethanol on addition of ether, and melts at 180–181° C.;

3,4 - dihydroxyphenisopropyl propylammonium chloride, which crystallizes in concentrated hydrochloric acid solution, and after recrystallization from ethanol on addition of ether, then washing with acetone, melts at 186–188° C.; or 3,4-dihydroxyphenisopropyl isopropylammonium chloride, which crystallizes from ethanol and ether, and after acetone washing melts at 205–206° C.

These salts are white in color and stable on standing in air. They dissolve readily in water and from a concentrated solution their bases may be precipitated by addition of an equivalent of ammonia solution, and the bases so prepared can be converted into various salts by addition of equivalent amount of acids. Alkaline solutions of these compounds rapidly oxidize to yield gummy base products which are not satisfactory for further working. Solutions of the free bases in water may be obtained by neutralization of solutions of their salts of low enough concentration for the resultant base to remain dissolved.

The bases, or more preferably the salts thereof, are suitable for medical preparations, alone or together with other substances, in solutions, and in liquid and solid mixtures.

We claim:

1. A 3,4-dihydroxyphenisopropyl alkylamine of the group consisting of a base and salts thereof, said base having the formula

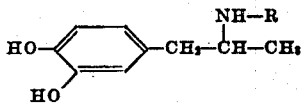

wherein R represents a member of the group consisting of $CH_3$, $C_2H_5$, n—$C_3H_7$ and iso—$C_3H_7$.

2. A 3,4-dihydroxyphenisopropyl alkylamine base having the formula

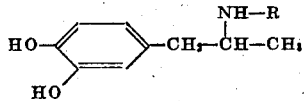

wherein R represents a member of the group consisting of $CH_3$, $C_2H_5$, n—$C_3H_7$ and iso—$C_3H_7$.

3. A salt of a 3,4-dihydroxyphenisopropyl alkylamine base having the formula

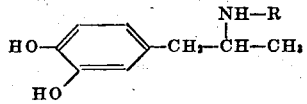

wherein R represents a member of the group consisting of $CH_3$, $C_2H_5$, n—$C_3H_7$ and iso—$C_3H_7$.

4. An α-methyl-β-(3,4-dihydroxyphenyl)ethyl methylamine of the group consisting of α-methyl-β-(3,4-dihydroxyphenyl)ethyl methylamine and salts thereof.

5. An α-methyl-β-(3,4-dihydroxyphenyl)ethyl ethylamine of the group consisting of α-methyl-β-(3,4-dihydroxyphenyl)ethyl ethylamine and salts thereof.

6. An α-methyl-β-(3,4-dihydroxyphenyl)ethyl isopropylamine of the group consisting of α-methyl-β-(3,4-dihydroxyphenyl)ethyl isopropylamine and salts thereof.

GORDON A. ALLES.
ROLAND N. ICKE.